United States Patent [19]

Weaver, Jr. et al.

[11] Patent Number: 4,799,625
[45] Date of Patent: Jan. 24, 1989

[54] METHOD AND APPARATUS FOR ADJUSTING A SHEAR BAR RELATIVE TO A CUTTER HEAD

[75] Inventors: Marvin G. Weaver, Jr., Lititz; Carl E. Bohman, New Holland; Richard P. Strosser, Akron; John R. McClure, New Holland; Mark K. Chow, Leola, all of Pa.

[73] Assignee: Ford New Holland, Inc., New Holland, Pa.

[21] Appl. No.: 46,011

[22] Filed: May 5, 1987

[51] Int. Cl.$^4$ ............................................. B02C 25/00
[52] U.S. Cl. ........................................ 241/30; 241/37; 241/101.7; 241/241; 340/684; 340/686
[58] Field of Search ...................... 241/37, 101.7, 222, 241/242, 101.3, 239, 240, 241, 30, 101.2; 73/660; 324/61 R; 340/684, 686

[56] References Cited

U.S. PATENT DOCUMENTS

| | | | |
|---|---|---|---|
| 3,769,666 | 11/1973 | Kaufman | 241/37 X |
| 4,198,006 | 4/1980 | Rolfe | 241/37 |
| 4,205,797 | 6/1980 | Bennett et al. | 241/37 X |
| 4,412,212 | 10/1983 | Kolegraff et al. | 340/684 |
| 4,436,248 | 3/1984 | Lindblom et al. | 241/101.7 |
| 4,474,336 | 10/1984 | Fleming | 241/221 |
| 4,479,346 | 10/1984 | Chandler | 241/37 X |

FOREIGN PATENT DOCUMENTS

| | | |
|---|---|---|
| 3010416 | 9/1981 | Fed. Rep. of Germany . |
| 3345749 | 6/1984 | Fed. Rep. of Germany . |
| 82/01299 | 4/1982 | PCT Int'l Appl. . |
| 1187377 | 4/1970 | United Kingdom . |

Primary Examiner—Mark Rosenbaum
Attorney, Agent, or Firm—Griffin, Branigan, & Butler

[57] ABSTRACT

Under the control of a microprocessor first and second motors alternately drive first and second ends of a shear bar for adjusting the position of the shear bar relative to cutter head. The shear bar is adjusted so that it is substantially parallel to the cutter head even though the cutter head and shear bar may not be parallel at the time the adjustment is initiated. A knock sensor is provided for sensing impacts between the cutter head and shear bar, the knock sensor output signal being converted to a digital value for controlling the adjusting sequence. A knocker is provided for inducing vibrations in the shear bar to thereby test the operability of the knock sensor and its output circuitry. The sensitivity of the adjustment system to the output of the knock sensor is set automatically before an adjustment sequence begins to account for variations in the knock sensor, its output circuitry, and "noise" vibrations induced in the shear bar by normal machine operation.

12 Claims, 11 Drawing Sheets

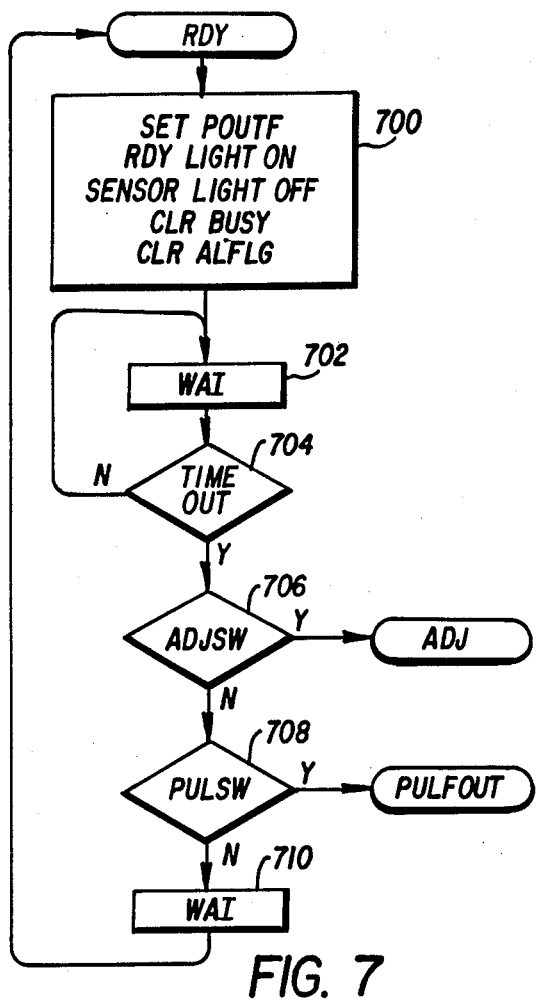
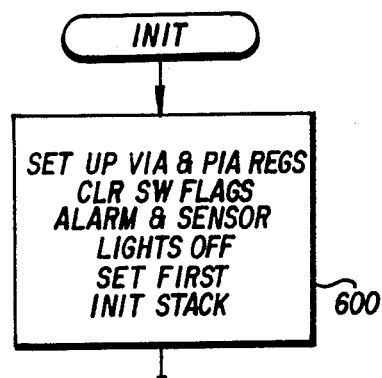
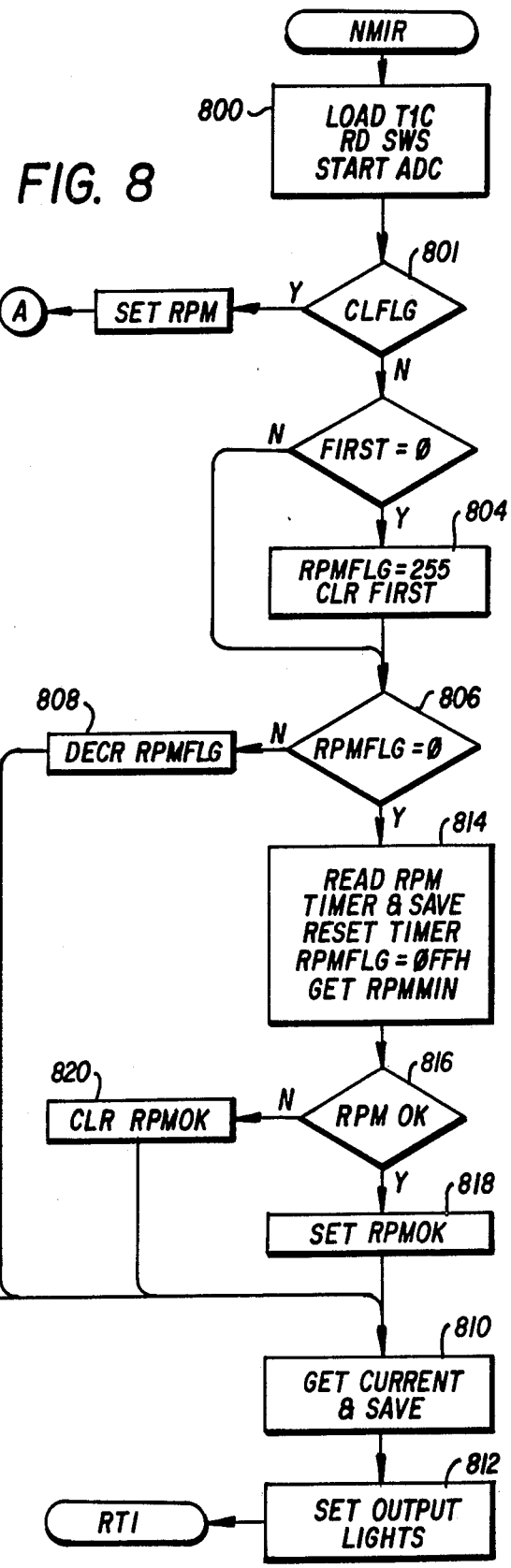
FIG. 7
FIG. 6
FIG. 8

METHOD AND APPARATUS FOR ADJUSTING A SHEAR BAR RELATIVE TO A CUTTER HEAD

FIELD OF THE INVENTION

The present invention relates to forage harvesters and more particularly to a method and apparatus for automatically adjusting the position of a shear bar so that it is parallel to a rotating cutter head, no operator intervention being required except for actuating a switch to initiate the adjustment operation.

BACKGROUND OF THE INVENTION

Lindbloom et al. U.S. Pat. No. 4,436,248 and commonly assigned pending application Ser. No. 784,391 now U.S. Pat. No. 4,678,130 each disclose an apparatus for manually adjusting the shear bar in a forage harvester relative to a rotating cutter head carrying a plurality of knives. In both the patent and the application, adjustment is accomplished by manually turning a first or a second knob to thereby move a first or a second end of a shear bar. In actual practice, adjustment is carried out by turning the knobs and listening for the "tick" as the rotating cutter blades make contact with the shear bar. When the "tick" is heard, the shear bar is backed off until the sound is no longer heard. The adjustment is imprecise, time consuming, and requires that the operator leave his seat to accomplish the adjustment.

German DE No. 33 45 749A discloses the use of a single motor for simultaneously driving linkages connected to both ends of a harvester shear bar to rotating cutter head. Because both linkages are driven by a single motor, and are thus driven equally, it is not possible to automatically adjust the shear bar if it is not initially parallel to the cutter head and parallelism must be effected manually before the automatic adjustment may be accomplished.

In Keeney (WO 82/01299) a potential between a shear bar and a cutter head is monitored and a microprocessor controls a single motor to adjust the shear bar. In this device too, it is necessary that parallelism be first established by manual adjustment.

German OS No. 30 10 416 discloses the use of an acoustic or optical non-contact sensor for monitoring the gap between the fixed and moving blades of a harvester. In this device the sensor monitors the gap between the fixed and moving blades by sensing the proximity of the moving blades and if the gap varies beyond predetermined limits the harvester operation is stopped. No provision is made for utilizing the sensor output to adjust the gap.

In an automatic adjustment system wherein contact between the shear bar and rotating cutter head is sensed to control the adjustment, it is essential that the vibration sensor be in good operating condition. If the sensor or its associated wiring is faulty, or the cutter head is not rotating, the adjustment mechanism may drive the shear bar too far toward the blades of the rotating cutter head thus damaging the shear bar, cutter blades and/or adjustment drive mechanism. In accordance with one aspect of the present invention, the operability of the vibration sensor is repeatedly checked before and during a shear bar adjustment operation and checks are made to insure that the cutter head is rotating at or above a predetermined minimum speed.

Background noise, that is, the vibrations induced by normal harvester operation, is particularly troublesome when vibration sensors are utilized in an automatic shear bar adjustment system. In accordance with a further aspect of the present invention, means are provided for adapting the threshold of the vibration detection system in accordance with the level of background noise so that vibrations resulting from contact between the shear bar and rotating cutter blades may be reliably distinguished from vibrations resulting from normal harvester operation.

SUMMARY OF THE INVENTION

An object of the present invention is to provide a method and apparatus for automatically adjusting a shear bar relative to a rotating cutter head even though the shear bar and cutter head may not be parallel to each other prior to initiation of the adjustment operation.

An object of the invention is to provide a method and apparatus for adjusting a shear bar relative to a rotating cutter head by alternately energizing a first or a second drive motor to alternately move a first or a second end of the shear bar relative to the rotating cutter head.

Another object of the invention is to provide an adjusting apparatus including first and second bidirectional motors each attached to a shear bar near a respective end thereof, an acoustic sensor mounted on the shear bar support for sensing vibrations induced when a rotating cutter head contacts the shear bar, and an electrical control circuit or microprocessor initiated by actuation of a switch for automatically controlling the motors in response to vibrations sensed by the sensor, to thereby adjust the shear bar relative to the cutter head. Prior to and during the adjusting procedure the microprocessor senses the speed of rotation of the cutter head and initiates movement of the shear bar only when the cutter head is rotating at or above some predetermined speed.

A further object of the invention is to provide an electrical control circuit as described above wherein the microprocessor not only controls the motors but also controls the testing of the operability of the sensor and adjusts its sensitivity. A knocker or impact element is mounted on the shear bar support to induce vibrations therein in response to pulses generated under the control of the microprocessor. The vibrations are sensed by the sensor and the resulting electrical signal applied to an analog to digital converter to develop a digital indication of the sensor output. The microprocessor then compares the digital indication with a reference value and halts the adjusting procedure if the digital indication does not exceed the reference value.

Another object of the invention is to provide an electrical control circuit as described above and further including means for adjusting the sensitivity of the control circuit to output signals from the knock sensor. The sensitivity is adjusted by sensing the "noise" vibrations in the shear bar support and developing digital indication of the noise. During the adjusting procedure this digital indication is added to a safety factor value and the output of the knock sensor (after analog to digital conversion) is compared to the sum. Thus, the magnitude of the output signal from the knock sensor required to indicate impact between the shear bar and cutter head varies depending on the noise vibrations induced in the shear bar by normal harvester operation.

Other objects of the invention and its mode of operation will become apparent upon consideration of the following description and the accompanying drawings.

BRIEF DESCRIPTION OF THE DRAWINGS

FIG. 6 shows the INITIALIZE routine;

FIG. 7 shows the READY routine;

FIG. 8 shows the NMIR routine;

DETAILED DESCRIPTION OF THE INVENTION

Figure 1:
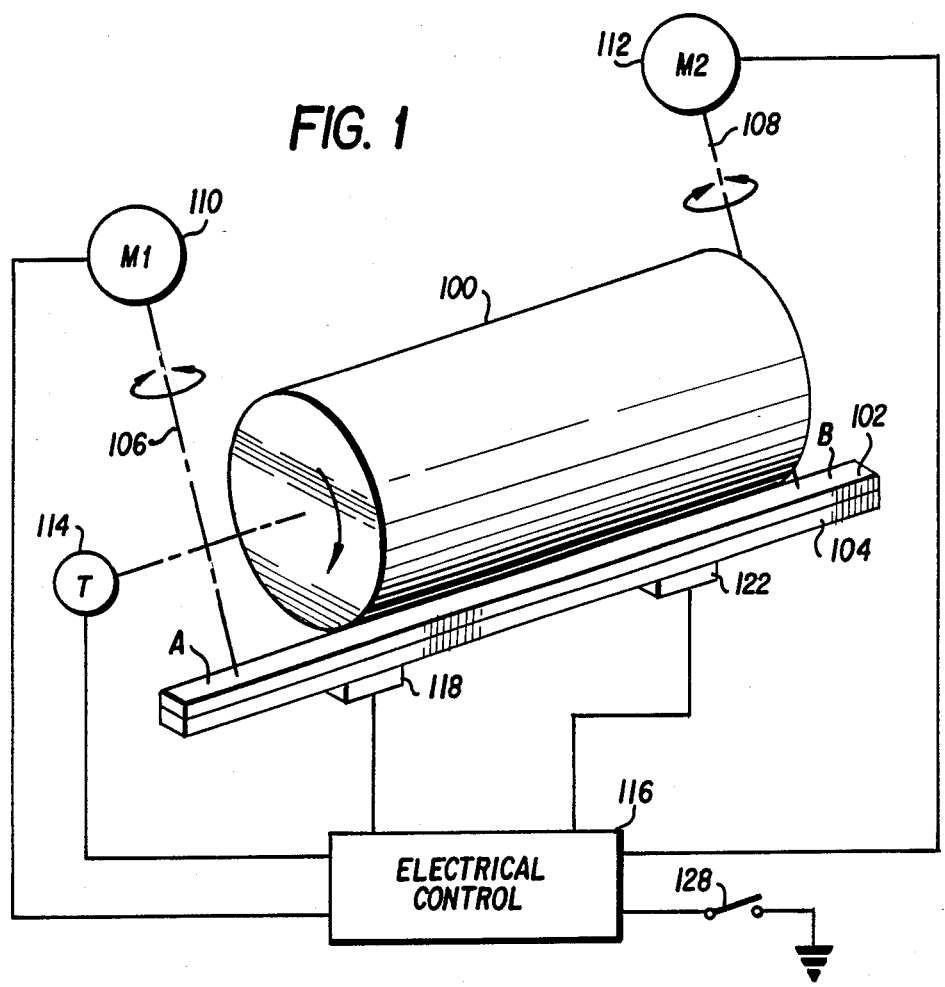
FIG. 1 schematically illustrates an adjustment control system for automatically controlling the adjustment of a shear bar relative to a rotating cutter head.

FIG. 1 schematically illustrates a cutting apparatus comprising a rotating cutter head 100 and an adjustable but fixed shear bar 102. By way of example only, the cutting apparatus may be the cutter head and shear bar of a forage harvester as illustrated in commonly assigned U.S. application Ser. No. 783,391. The shear bar 102 is mounted on a support bar 104 but is movable with respect to the support bar by actuation of linkages such as a pair of lead screws 106, 108. The cutter head carries a plurality of knives which, as the cutter head rotates, cooperate with the shear bar 102 to cut material passing between the cutter head and the shear bar.

A first bidirectional motor 110 drives lead screw 106 which is linked to a first end A of the shear bar. A second bidirectional motor 112 drives lead screw 108 which is linked to a second end B of the shear bar.

Adjustment of the shear bar 102 relative to the cutter head 100 is accomplished with the cutter head rotating. A tachometer 114 senses rotation of the cutter head shaft and produces a sequence of pulses indicating the cutter head speed which is applied to an electrical control circuit 116. Adjustment is accomplished by sensing vibrations, or the absence of vibrations in the support bar 104 resulting from contact, or the lack of contact, between the shear bar 102 and the knives of the rotating cutter head. A vibration sensor 118, which may be a crystal, is attached to the support bar 104. The support bar has an internally threaded hole 120 (FIG. 3) for receiving a threaded mounting stud provided on the crystal mount.

Since adjustment is accomplished by sensing vibrations resulting from contact between the shear bar and the knives of the cutter head, it is essential that shear bar adjustment not be attempted if the sensor 118 is not functioning. A solenoid-actuated knocker 122 is provided for determining the operability of the knock sensor. The knocker has a threaded mounting stud which secures the knocker to an internally threaded hole 124 in the support bar 104. The solenoid has a spring-biased armature which carries an impact element 126 at its end. When the solenoid is energized it drives the impact element 126 into contact with the support bar 104, inducing vibrations in the support bar which are sensed by the sensor 118. The electrical controls 116 pulse the knocker 122 and analyze the signals returned by the sensor 118.

A push-button switch 128 is provided on a control panel near the operator. Each time the operator actuates switch 128, the electrical control circuit 116 checks the operability of sensor 118 as well as its sensitivity, checks to determine that the cutter head is rotating and selectively energizes first one of the motors 110, 112 and then the other until the cutter bar 102 is essentially parallel to the cutter head 100 and spaced therefrom by no more than a small predetermined distance on the order of a few thousandths of an inch.

Figure 4C:
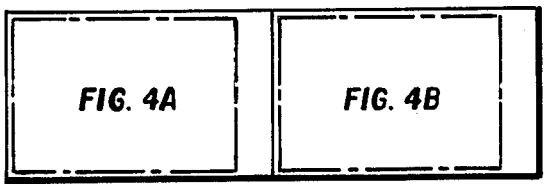
FIGS. 4A and 4B, when arranged as shown in FIG. 4C, comprise a circuit diagram of the electrical controls for controlling the shear bar adjustment and the testing and sensitivity adjustment of the vibration sensor.
Figure 4A:
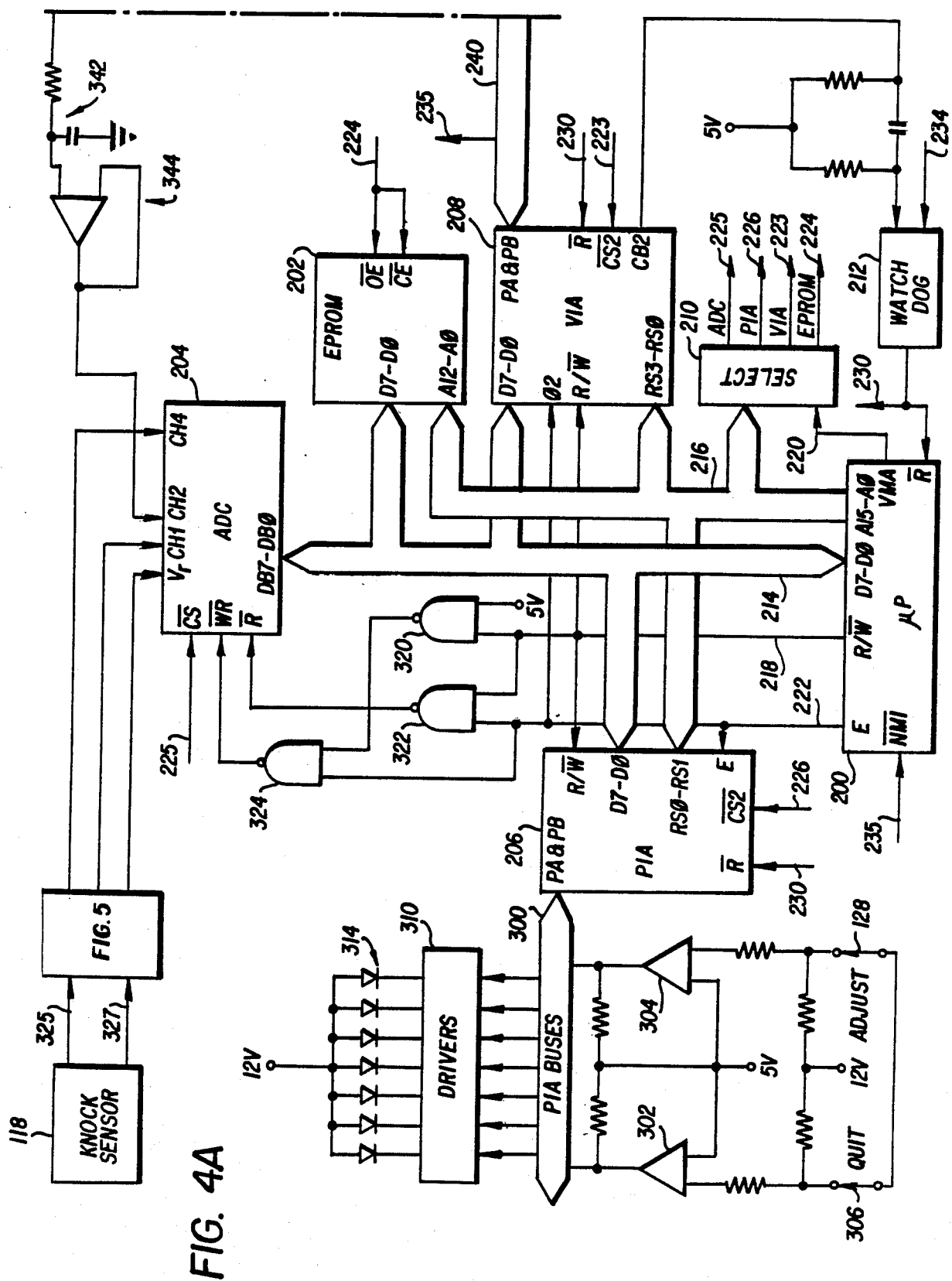
Figure 4B:
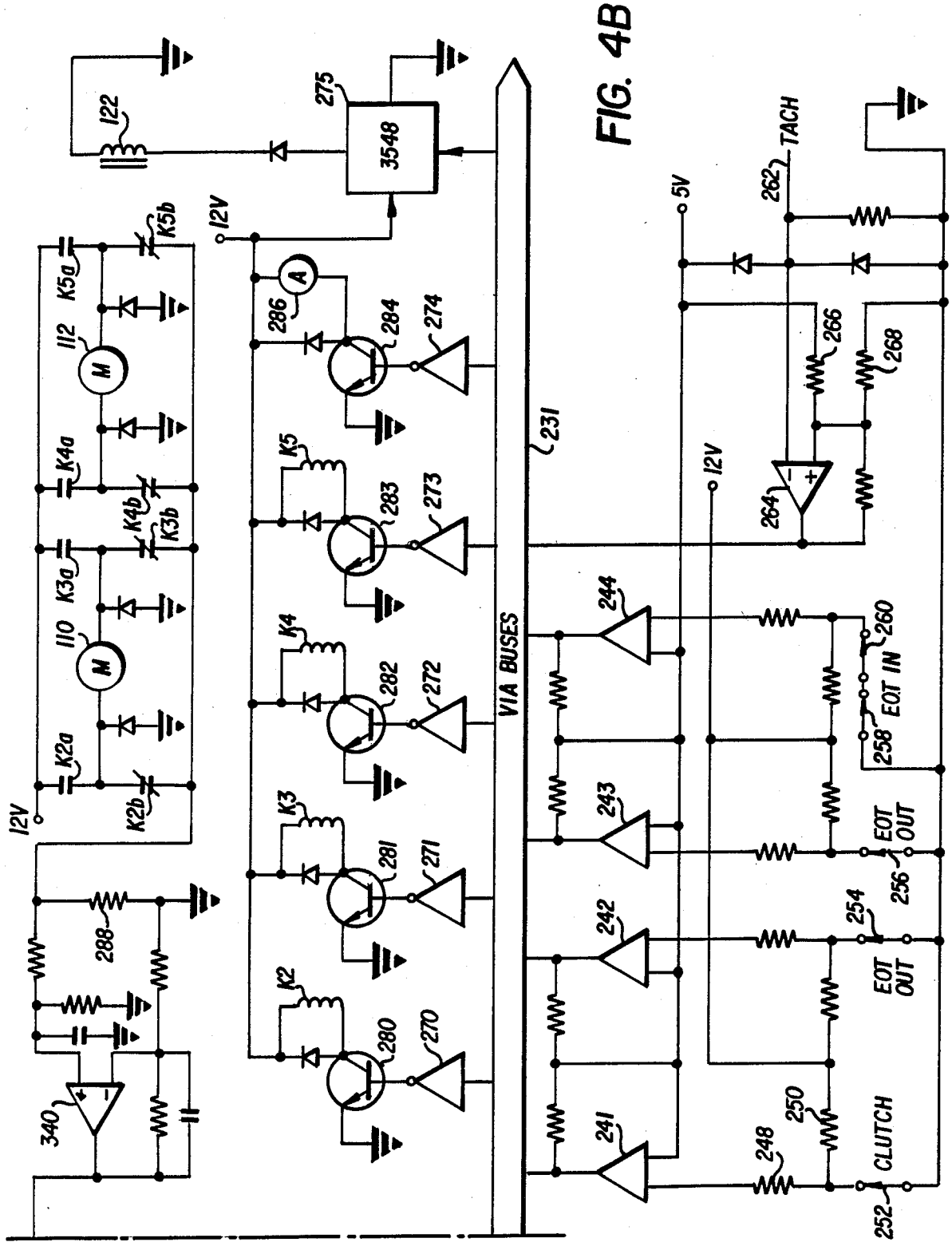

The electrical control circuits 116 are illustrated in FIGS. 4A and 4B and include a microprocessor 200, an EPROM 202, an analog to digital converter (ADC) 204, a peripheral interface adapter (PIA) 206, a versatile interface adapter (VIA) 208, an address decoder or selector 210 and a watch dog circuit 212. All units except the watch dog circuit are interconnected by an 8-bit bidirectional data bus 214 and/or a 16-bit address bus 216.

Since the details of the VIA 208, microprocessor 200, EPROM 202, ADC 204, PIA 206, and address decoder 210 are well known in the art, they are not described in detail herein but a brief description of each is given below.

The microprocessor 200 may be a Motorola type 6802 microprocessor including an internal memory for limited storage of data during a microprocessor operation. The microprocessor has eight input/output terminals D7-D$\phi$ which are connected to the data bus 214 and sixteen output terminals A15-A$\phi$ for supplying an address generated within the microprocessor to the address bus 216. When a data register within the microprocessor is loaded with a byte of data for application to the data bus the microprocessor drives the signal R/$\overline{\text{W}}$ on lead 218 to logic $\phi$ and when the data register is to receive a byte of data from the data bus the microprocessor causes the signal R/$\overline{\text{W}}$ to go to logic 1. When the microprocessor places an address on the address bus it generates the signal Valid Memory Address (VMA) on lead 220 and this signal is applied to the gating input of address decoder 210. The microprocessor outputs a single phase clock onto lead 222 from its E terminal.

Microprocessor 200 has a non-maskable interrupt (NMI) input terminal. A low-going signal at this terminal causes the microprocessor to initiate a non-maskable interrupt sequence. The microprocessor also has a reset input terminal $\overline{\text{R}}$ and when the signal on lead 230 goes to low the registers within the microprocessor are cleared and the microprocessor becomes inactive. When the signal at terminal $\overline{\text{R}}$ goes high it causes the microprocessor to begin a restart sequence.

Address bus bits A15-A13 are connected to input terminals of the address decoder 210. Each time the microprocessor outputs a signal on lead 220, it enables the address decoder to decode the three address bits and produce a signal on one of the leads 223-226. The lead 223 is connected to the CS2 input of VIA 208. Lead 224 is connected to the $\overline{\text{OE}}$ and $\overline{\text{CE}}$ inputs of EPROM 202. Lead 225 is connected to the $\overline{\text{CS}}$ input of ADC 204 while lead 226 is connected to the CS2 input of PIA 206.

The EPROM 202 may be a type 2764 capable of storing 8K 8-bit bytes. When the signal on lead 224 is low the location in the EPROM specified by the address applied to the EPROM from bus 216 is accessed. The location is either written to from the microprocessor, or read out to the microprocessor, depending upon whether the signal R/$\overline{\text{W}}$ is low or high, respectively. EPROM 202 stores data and the program which is executed by the microprocessor.

The VIA 208 may be a type 6522 such as that manufactured by Rockwell or Synertek. As disclosed at page 2526-2530 of the publication IC Master 1980, published by United Technical Publications, the VIA 208 includes 16 addressable registers and interval timers or counters. These registers and interval timers are addressed by applying an address from the four low order of bits of the address bus 216 to the register select input RS3-RS$\phi$. Data is read from, or entered into the registers and counters through data terminals D7-D$\phi$ which are connected to the data bus 214. The VIA is enabled only when the microprocessor outputs a hexadecimal address, the high order bits of which cause the address decoder 210 to produce a low signal on lead 223 which enables the chip select CS2 input of the VIA. The register or counter which is accessed is determined by the four low order bits of the address bus which are applied to register select inputs RS3-RS$\phi$ of the VIA. The accessed register or counter is either read from or written into depending upon whether the microprocessor 200 outputs a high or low level signal, respectively, on lead 218 to R/$\overline{\text{W}}$ terminal of the VIA. The $\phi$2 input of the VIA is a clocking input and is used to trigger data transfers. It is connected by lead 222 to the E terminal of the microprocessor. All circuits within VIA 208 are reset when the signal $\overline{\text{RES}}$ on lead 230 goes low. The VIA 208 produces an output signal CB2 which is used for control purposes. The microprocessor program periodically sends a byte of control information to VIA 208 to toggle CB2 and pulse watch dog circuit 212. The watch dog circuit may be two monostable multivibrators connected in series. Periodic pulses produced on lead 232 by the VIA periodically reset the watch dog circuit so that its output remains inactive. If the program should fail to send signals to the VIA 208 so that lead 232 is pulsed, the watch dog circuit times out and emits an output signal to reset the microprocessor, the VIA and the PIA 206. The watch dog circuit 212 also has an input 234 which is derived from a monitoring circuit (not shown) which monitors the logic circuit supply voltage. If this voltage should vary outside predetermined limits the signal on lead 234 cause the watch dog circuit 212 to produce an output signal to reset the microprocessor, the PIA and the VIA. The 5 V supply voltage for the circuits of FIGS. 4A and 4B may be derived from the 12 V battery which supplies power for the harvester if it is self-propelled, or from the battery for the tractor which pulls the harvester.

VIA 208 has two 8-bit input/output ports PA and PB. The bit positions of the ports are individually programmable as either an input or an output. Two buses, collectively designated 231, connect PA and PB to external circuits shown in FIG. 4B. The port A bus is connected to receive the outputs of a plurality of amplifers 241-244. Amplifier 241 has one input connected to the 5 V logic supply voltage and a second input connected through two resistors 248 and 250 to the 12 V power supply. The junction between resistors 248 and 250 is connected through a switch 252 to ground. As long as switch 252 is closed the amplifier applies a logic $\phi$ signal to the bus but when switch 252 is open the amplifier applies a logic 1 signal to the bus. The switch 252 is associated with an engage lever (not shown) which is actuated so that a chain drive causes the cutter head 100 to rotate. Switch 252 is thus closed when drive power is applied to the cutter head.

Amplifiers 242-244 are arranged in the same manner as amplifier 241, with switches 254 and 256 being associated with amplifiers 242 and 243, respectively and switches 258 and 260 being associated with amplifier 244. These switches are all limit switches for sensing when the ends of the shear bar 102 have reached their limits of travel toward or away from the cutter head 100. Switches 254 and 256 are actuated when ends A and B, respectively, of the shear bar are at their limit of travel away from the cutter head. Switches 258 and 260 are connected in series so that amplifier 244 produces a logic 1 output when either switch is opened, i.e. when either end A or end B is at its limit of travel toward the cutter head. The limit switches are incorporated within the housings of motors 110 and 112 and are actuated by mechanical bidirectional counter mechanisms which count rotations of lead screws 106 and 108.

The tachometer 114 (FIG. 1) produces a sequence of output pulses at a rate proportional to the speed of rotation of the cutter head 100. The pulses are applied over a lead 262 (FIG. 4B) to one input of a comparator amplifier 264. A voltage divider comprising two resistors 266 and 268 is connected between 5 V and ground, and a reference voltage is applied from the junction of the resistors to a second input of amplifier 264. When the tachometer produces an output pulse exceeding the magnitude of the reference voltage, amplifier 264 applies a logic 1 signal to bit position 6 of the B bus. These pulses are counted by a counter (timer 2) in VIA 208.

Five bits of port B of the VIA are connected by a B bus to five inverters 270-274. The outputs of inverters 270-273 are connected to the bases of grounded emitter transistors 280-284, respectively. The collectors of transistors 280-283 are connected to the 12 V source through the coils of relays K2-K5, resepctively, while the collector of transistor 285 is connected to the 12 V source through an audible alarm 286.

Figure 2:
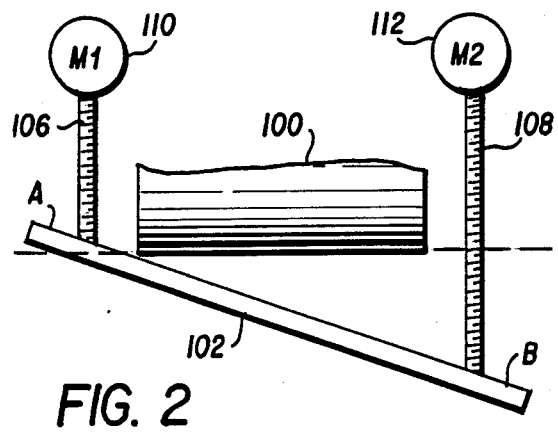
FIG. 2 is a diagram useful in explaining the method of adjusting the shear bar.

The direction of rotation of motor 110 is controlled by the contacts of relays K2 and K3, only one of which may be energized at any given time. If relay K2 is energized the motor rotates in one direction to move end A (FIG. 2) of the shear bar 102 inwardly toward the cutter head 100. The current flow path extends from 12 V through contacts K2a, motor 110, normally closed contacts K3b and resistor 288 to ground. On the other hand, if relay K3 is energized, a circuit extends from the 12 V source through contacts K3a, motor 110, contacts K2b and resistor 288 to ground. Since current flow is in the opposite direction through the motor, it rotates in the opposite direction to move end A of the shear bar away from the cutter head. If neither relay K2 or K3 is energized, motor 110 does not rotate because contacts K2a and K3a are both open.

Relays K4 and K5 have normally open contacts K4a and K5a and normally closed contacts K4b and K5b. Relays K4 and K5 control the motor 112 in exactly the same manner that motor 110 is controlled by relays K2 and K3.

Bit 7 of port B of VIA 208 is controlled by one of the timers in VIA 208. The timer (T1C) causes an interrupt pulse to appear at PB7 each time the counter is loaded, the delay between the loading of the counter and the occurrence of the pulses being determined by the value entered into the counter. PB7 is connected by a lead 235 to the $\overline{\text{NMI}}$ input of microprocessor 200 so that the program being executed by the microprocessor is interrupted periodically and a routine is executed to read the various switches and output various control signals to the VIA and PIA busses.

One bit of the PB bus is connected to a type 3548 PNP driver circuit. The output of the driver circuit is connected to ground through the solenoid of knocker 122. As subsequently explained, the solenoid is energized to induce vibrations in the shear bar 104 and the resulting vibrations sensed by sensor 118 are analyzed to determine its operability.

The PIA 206 may be a type 6821 peripheral interface adapter. This device is well known in the art and is generally similar to VIA 208 except that it does not include timers. PIA 206 has two 8-bit ports PA and PB connected to an A bus and a B bus, collectively illustrated as buses 300. The bit positions of the ports are individually programmable for input or output. Only 2-bit positions of port A are utilized and they are programmed as inputs. These bit positions receive the outputs of the two amplifiers 302 and 304. A quit switch 306 is connected between ground and one input of amplifier 302 so that when the switch is closed the amplifier applies a logic 1 signal to the PIA over the bus. Switch 306 is actuated to halt or interrupt a shear bar adjusting operation.

The switch 128 is connected to one input of amplifier 304 and when this switch is actuated the amplifier applies a logic 1 signal to the PIA over the bus. Switch 128 is the ADJUST switch which initiates a shear bar adjusting sequence.

Only seven bits of port B of PIA 206 are utilized and they are all programmed as outputs. Each bit is connected through a driver 310 and an LED 314 to 12 V. The LEDs provide an operator with visual alarms or indications of the status of the system by indicating that the system is ready to begin an adjusting cycle; switch 306 has been actuated to interrupt an adjusting cycle; a motor 110 or 112 has stalled; the cutter head is not rotating; an end of travel has been reached; the sensor 118 is bad; or a shear bar adjusting operation is in progress.

ADC 204 may be a type 0844 converter such as that described at page 3537 of the publication IC Master, Vol. 2, 1984. The converter has four multiplexed input channels but only CH1, CH2 and CH4 are utilized in the present invention. The converter is enabled only when the address applied to selector 210 by microprocessor 200 causes the signal on lead 225 to be low. This lead is connected to the $\overline{\text{CS}}$ terminal of the converter.

The microprocessor 200 starts a converter cycle by placing a command on data bus 214 to select the channel, and driving lead 218 low. Lead 218 is connected to one input of two NANDs 320 and 322. The second input of NAND 320 is connected to +5 V and the output of the NAND is connected to a further NAND 324. The E output of microprocessor 200 is connected to one input of NANDs 322 and 324 and the outputs of these NANDs are connected to the R and $\overline{\text{WR}}$ inputs, respectively, of the converter. When the signal on lead 218 is low, NAND 324 produces a low output when the clocking signal on lead 222 goes high. The output of NAND 324 enables the converter so that the operation specified by the command is carried out.

It takes the converter about 40 microseconds to convert an analog value to a digital value. The programming of microprocessor 200 is such that once it initiates a cycle of converter 204 it either waits or performs other operations until at least 40 microseconds have elapsed. The microprocessor then places an address on bus 216 so that selector 210 produces a signal on lead 225 to select the converter. At the same time, the microprocessor drives the signal on lead 218 high. When the clock signal on lead 222 goes high NAND 322 produces an output signal which enables the converter to place the converted value on bus 214 from whence it passes to the microprocessor 200.

Figure 5:
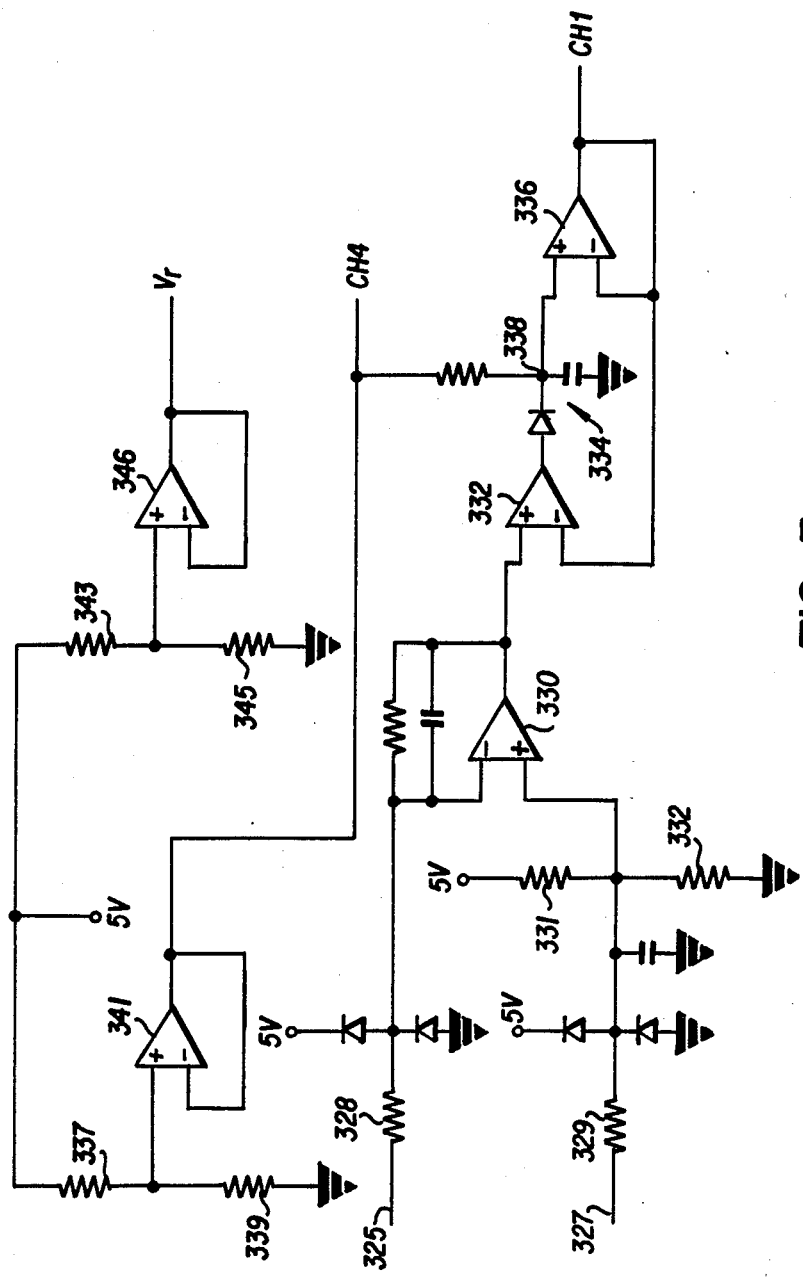
FIG. 5 shows the knock sensor output circuits and the circuits for applying reference signals to the analog to digital converter.

The analog signal from knock sensor 118 is applied to the CH1 input of the A/D converter through a circuit (FIG. 5) including resistors 328 and 329, amplifiers 330 and 332, a peak hold circuit 334 and a buffer amplifier 336. A pair of resistors 331, 333 provide a first reference voltage which is added to the knock sensor output signal, the output of amplifier 330 being proportional to the sum of the reference signal and the differential signal derived from the sensor. A second reference voltage is derived from a voltage devider comprising resistors 337 and 339. The second reference voltage is applied to an amplifier 340 and the output of the amplifier is tied to a junction 338 between the peak hold circuit 334 and buffer amplifier 336.

The output of amplifier 341 is also applied to the CH4 input of ADC 204. The ADC 204 is controlled to operate in a differential mode so that it determines the difference in the magnitude of the analog signals at CH1 and CH4 and converts this difference to a digital value for tansmission to the microprocessor 200.

Resistors 343 and 345 form a voltage divider which is tapped to provide an input to an amplifier 346. The output of this amplifier is applied to the $V_r$ input of ADC 204 to set the range of the converter.

During a shear bar adjusting operation motors 110 and 112 (FIG. 4B) control the movement of the shear bar. As previously explained, the circuit for energizing either motor in either direction extends through current sensing resistor 288. Thus, by sampling the voltage across the resistor it is possible to determine if either motor is stalled or if the motor which should be running is not actually energized. The voltage developed across resistor 288 is applied through an operational amplifier 340, filter circuit 342, and buffer amplifier 344 to the CH2 input of ADC 204 where it may be sampled. The ADC does not subtract the magnitude of the CH4 signal from the CH2 before doing an ADC.

INITIALIZE, READY and NMIR Routines

When power is turned on the microprocessor 200 automatically goes through an initialization routine (FIG. 6) during which the various registers and timers in the VIA and PIA are set up. This routine also clears the switch registers or locations in memory 202 which store indications of the last sampled state of the various switches. The routine then clears the QUIT, PULSW, and RPMOK flags and sets a FIRST flag. In addition, flags are set to turn off the alarm and alarm lights as well as the sensor light. The stack in the microprocessor 200 is initialized after which the program proceeds to the first step of the READY routine.

The READY routine is illustrated in FIG. 7. It begins at step 700 by setting the flag POUTF. The ready light flag is set so that the ready light may be turned on when the NMIR routine is next executed. The sensor light flag is cleared so that the sensor light will be turned off the next time VIA 208 pulses the watchdog circuit 212. The BUSY and ALFLG flags are cleared after which the program proceeds to step 702 where it executes a wait for interrupt instruction. At about 2.5 MS intervals a pulse occurs at PB7 of the VIA 208 thereby pulsing the $\overline{\text{NMI}}$ input to microprocessor 200. The microprocessor interrupts the routine it is executing, in this case the READY routine, and executes the NMIR routine illustrated in FIG. 8.

At step 800, the NMIR routine loads the counter TIC in VIA 208. This counter is decremented and when it reaches zero it will again pulse PB7 of the VIA to initiate another NMIR routine. The VIA next senses the QUIT and ADJUST switches and sets flags indicating which switches are actuated. In addition, if both switches are actuated a flag PULSW is set. The microprocessor then addresses the ADC 204 to initiate a read-convert cycle with CH2 as the selected input. This samples the motor current and converts it to a digital value.

At step 801 the CLFLG flag is tested to see if the clutch in the cutter head drive chain has been engaged to actuate clutch switch 252. If it has not, a flag is set to turn on one of the indicator lights 314 to indicate that the RPM of the cutter head is not within limits, and the program branches to step 812 to turn on the indicator. A return is then made to the routine which was interrupted.

If CLFLG indicates that the clutch is engaged, the program proceeds to step 802 where the FIRST flag is tested. This flag was set during the INIT routine so the program proceeds from step 802 to step 804 where FIRST is cleared and a value is set into RPMFLG. This value will be counted down to time the interval during which tachometer pulses produced by the cutter head tachometer 114 will be counted by timer 2 in VIA 208.

At step 806 RPMFLG is tested to see if the timing interval has elapsed. Assuming it has not, the program decrements RPMFLG at step 808 and at step 810 the converted value of the current flowing through the shear bar adjusting motors is read from ADC 204 and saved. At step 812 the program sends data to PIA 206 to turn on the appropriate indicator lights. The program then returns to the routine which as interrupted to execute the instruction following the last instruction executed before the interrupt.

In FIG. 7, steps 702 and 704 comprise a loop which is repeatedly executed until the test at step 704 indicates that a preset interval of time has elapsed. The program then tests the ADJSW flag at 706 and the PULSW flag at step 708. Assuming that the ADJUST switch is not actuated either alone or concurrently with the QUIT switch, the program executes another Wait For Interrupt at step 710 and then loops back to step 700. Thus, assuming the ADJUST switch is not actuated the READY routine is repeatedly executed, the routine being interrupted every 2.5 MS to execute the NMIR routine. Because FIRST is cleared at step 804 during the first execution of the NMIR routine after the cutter head clutch is engaged, the program branches from step 802 to 806 on the second and subsequent exectutions of the routine. RMPFLG is decremented at step 808 each time the NMIR routine is executed and after 255 ms RPMFLG is reduced to zero. The test at step 806 proves true and the program moves to step 814 where the count of tachometer pulses accumulated by timer 2 in VIA 208 is read and saved, and RPMFLG is reloaded to time another 255 ms interval.

RPMMIN is a value representing the minimum permissible rate of rotation of the cutter head. At step 816 RPMMIN is compared with count of tachometer pulses. If the count is equal to or greater than RPMMIN the RPMOK flag is set at step 818. If the count is less than RPMMIN then RPMOK is cleared at step 820. After step 818 or 820 the ADC 204 is addressed to again get the converted value of the adjusting motor current.

TSTGEN Subroutine

Figure 3:
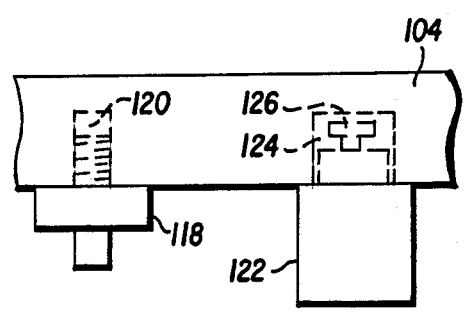
FIG. 3 illustrates the mounting of an impact element and a vibration sensor on a shear bar support.
Figure 9:
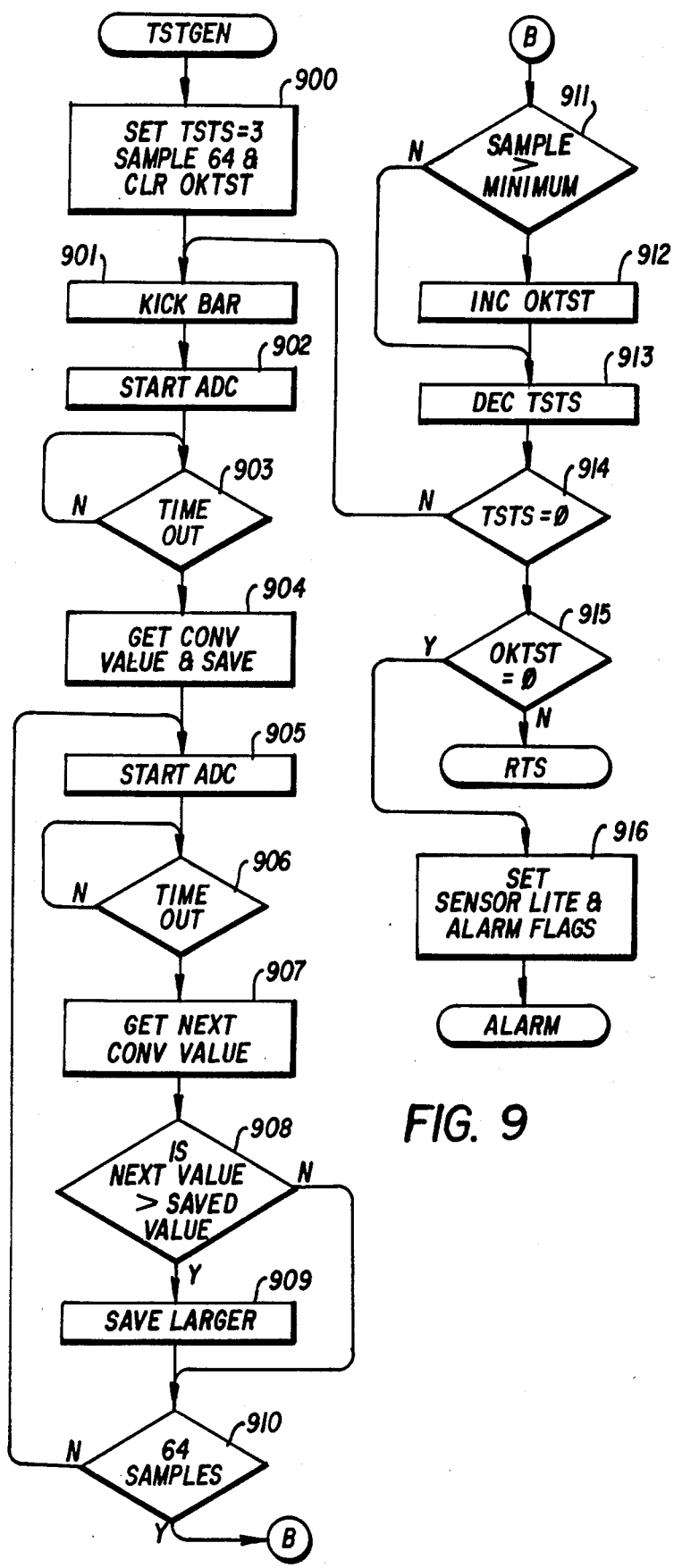
FIG. 9 shows the TSTGEN routine.

The purpose of the TSTGEN subroutine to check the operability of the knock sensor 118 and its associated circuitry. The TSTGEN subroutine is illustrated in FIG. 9 and begins at step 900 where TSTS is set to 3, SAMPLE is set to 64, and OKTST is cleared. At step 901 a value is sent to VIA 208 which causes the VIA to output a signal over its B bus to energize driver 275 thereby energizing the knocker solenoid 122. In FIG. 3, the clapper 126 is driven against support bar 104. This induces vibrations in the support bar which may be sensed by knock sensor 118 to produce an analog signal. This signal passes through the circuit of FIG. 5 and is applied to the CH1 input of ADC 204.

At step 902 the microprocessor addresses the ADC and starts a conversion cycle. At step 903 the microprocessor executes a delay loop waiting for 40 microseconds while the ADC samples the CH1 and CH4 inputs and converts the difference into a digital value. At step 904 the microprocessor addresses the ADC and saves the digital value which is an indication of the output of the knock sensor.

The program then enters a loop comprising steps 905-910. At step 905 another analog to digital conversion cycle is started, at step 906 the microprocessor waits for completion of the conversion cycle, and at step 907 the converted vlaue is retrieved from the ADC. Step 908 compares the latest (next) sample value with the previously converted value saved and the larger of the two values is saved. The value of SAMPLES is decremented and tested at step 910 and if it is not decremented to zero the program loops back to step 905. Thus, for one test the knocker solenoid is pulsed once at step 901 to induce vibration into the shear bar support and the output of the knock sensor is sampled 64 times, the largest of the 64 samples being saved at step 909. After the 64th sample the test at step 910 proves true and the program proceeds to step 911 where the saved largest sample is compared with a value representing the minimum acceptable magnitude for the signal output of the knock sensor.

If the largest sample is greater than or equal to the minimum acceptable magnitude OKTST is incremented at step 912 before TSTS is decremented at step 913. If the largest sample is less than the minimum acceptable magnitude the program branches from step 911 to step 913 without incrementing OKTST.

At step 914 TSTS is sampled to see if it has been decremented to zero. If it has not, the program branches back to step 901 to again pulse the knocker and determine the largest of the next 64 samples taken of the output of the knock sensor.

After three tests have been completed the test at step 914 proves true and at step 915 OKTST is sampled to see if it is still zero. If it is not, it means that the knock sensor test was successful and found at least one sample larger than the required minimum value. If OKTST is still zero it means that the knock sensor is not sensitive enough to be used, or its output circuitry is not functioning properly. The program branches to step 916 to set flags to turn on an indicator 314 and the alarm 286. A jump is then made to an alarm routine to sound the alarm and turn off the motors. Although the ALARM routine is not illustrated, it may be noted that the program continuously executes a loop in the ALARM routine until the operator turn the power off and then on so that the program again executes the INITIALIZE routine illustrated in FIG. 6.

The Get Noise Subroutine

Figures 10A, 10B:
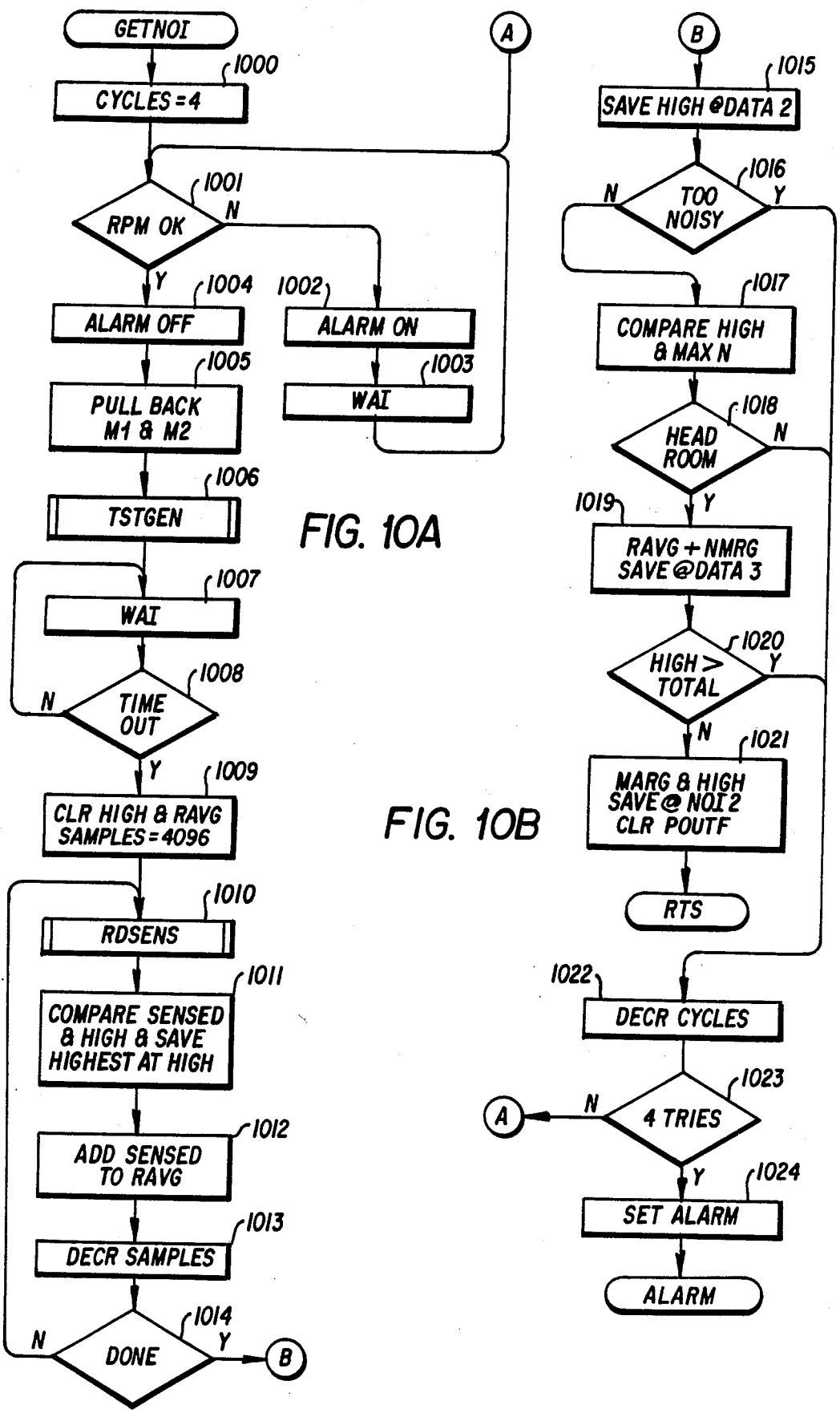
FIGS. 10A and 10B show the GETNOI routine.

The subroutine GETNOI is illustrated in FIGS. 10A and 10B. During execution of this routine the output of the knock sensor is tested up to four times, each test comprising 4096 samples. The maximum number of tests is set at step 1000 and the number of samples is set at step 1009. The purpose of GETNOI is to determine the noise vibrations induced in the shear bar as a result of normal machine operation, or more specifically the output of the knock sensor in response to these vibrations. The subroutine develops a digital indication of the noise and this digital indication is subsequently used in the ADJUST routine described below to set the sensitivity of the system to the output signal from the knock sensor.

At step 1001 the RPMOK flag is tested. This lag is set at step 818 of the NMIR routine if the cutter head speed is equal to or greater than the minimum speed represented by RPMMIN. If the cutter head is not up to speed the program branches to step 1002 where a flag is set to turn on the alarm. At step 1003 the program executes a Wait For Interrupt and after NMIR is executed to again sample the speed of the cutter head the program branches back to step 1001. The loop 1001–1003 is repeated until the speed of the cutter head is above the preselected minimum speed RPMIN. When the speed is satisfactory the NMIR routine will set RMPOK and upon return to GETNOI the test at step 1001 will prove true. The program then turns off the alarm flag at step 1004 and at step 1005 jumps to the PULOUT subroutine, subsequently described, which controls the shear bar adjusting motors 110 and 112 to move the shear bar away from the cutter head. This insure that there will be no contact between the cutter head and shear bar while the noise test is being made. Since the PULOUT routine energizes only one motor each time it is executed, step 1005 actually represents two executions of the subroutine.

At step 1006 the program jumps to the TSTGEN subroutine to test the operability of the knock sensor and its output circuitry. At steps 1007 and 1008 the program waits for an interrupt and for any vibrations induced in the shear bar during TSTGEN to die out.

Step 1009 clears two locations designated HIGH and RAVG, and sets SAMPLES to 4096. The program then enters a loop comprising steps 1010–1014. At step 1010 the program jumps to a RDSENS subroutine. This subroutine is not illustrated but comprises steps equivalent to steps 902–904. That is, it starts a conversion cycle to sense and convert the output of the knock sensor (minus the input to CH4) to a digital value, waits until the conversion is completed, and reads the converted sensed value from the ADC. At step 1011 this sensed value is compared with HIGH and the larger value is saved at HIGH. Step 1012 adds the sensed value to RAVG which is an accumulated sum of all sensed values. At step 1013 SAMPLES is decremented and at step 1014 it is tested to see if 4096 samples have been taken. If not, the program loops back to step 1010.

When 4096 samples have been taken, the program saves the largest of the samples at DATA2. The value in RAVG is tested by dividing it by a fixed value and testing the quotient to see if it exceeds a limit. If it does, it is an indication that there is too much background noise so the program branches to step 1022.

The occurrence of too much noise is not the only reason a noise test may fail. If the highest value sensed during the 4096 samples exceeds a predetermined maximum value it means that there is not enough "headroom". That is, when the output of the knock sensor resulting from contact between the cutter head and shear bar is added to the highest noise value, it will exceed the maximum input signal which the ADC can convert. The contents of HIGH are compared to MAXN and if MAXN is smaller the program branches to step 1022.

A noise test will also fail if the highest noise value sensed exceeds the average noise value of all the samples by more than a fixed value NMRG. RAVG is added to NMRG and saved at DATA3. HIGH is then compared to the resulting sum at step 1020 and if HIGH is greater the program branches to step 1022.

If a noise test fails for any reason, CYCLES is decremented at step 1022 and tested at step 1023. If it has been decremented to zero the program sets the alarm flag at step 1024 and jumps to the alarm routine. If four tests have not been completed the program branches from step 1023 back to step 1001.

If any test proves successful, then no further tests are made. If a test is successful then the test at step 1020 will prove false and the program proceeds to step 1021 where HIGH is added to MARG to obtain a "noise value". In effect, the ADJUST routine described below assumes that any output signal from the knock sensor less than this value is due to noise alone. The noise value is saved at NOI2, the POUTF flag is cleared, and a return is made to the calling routine.

PULOUT Subroutine

Figure 11:
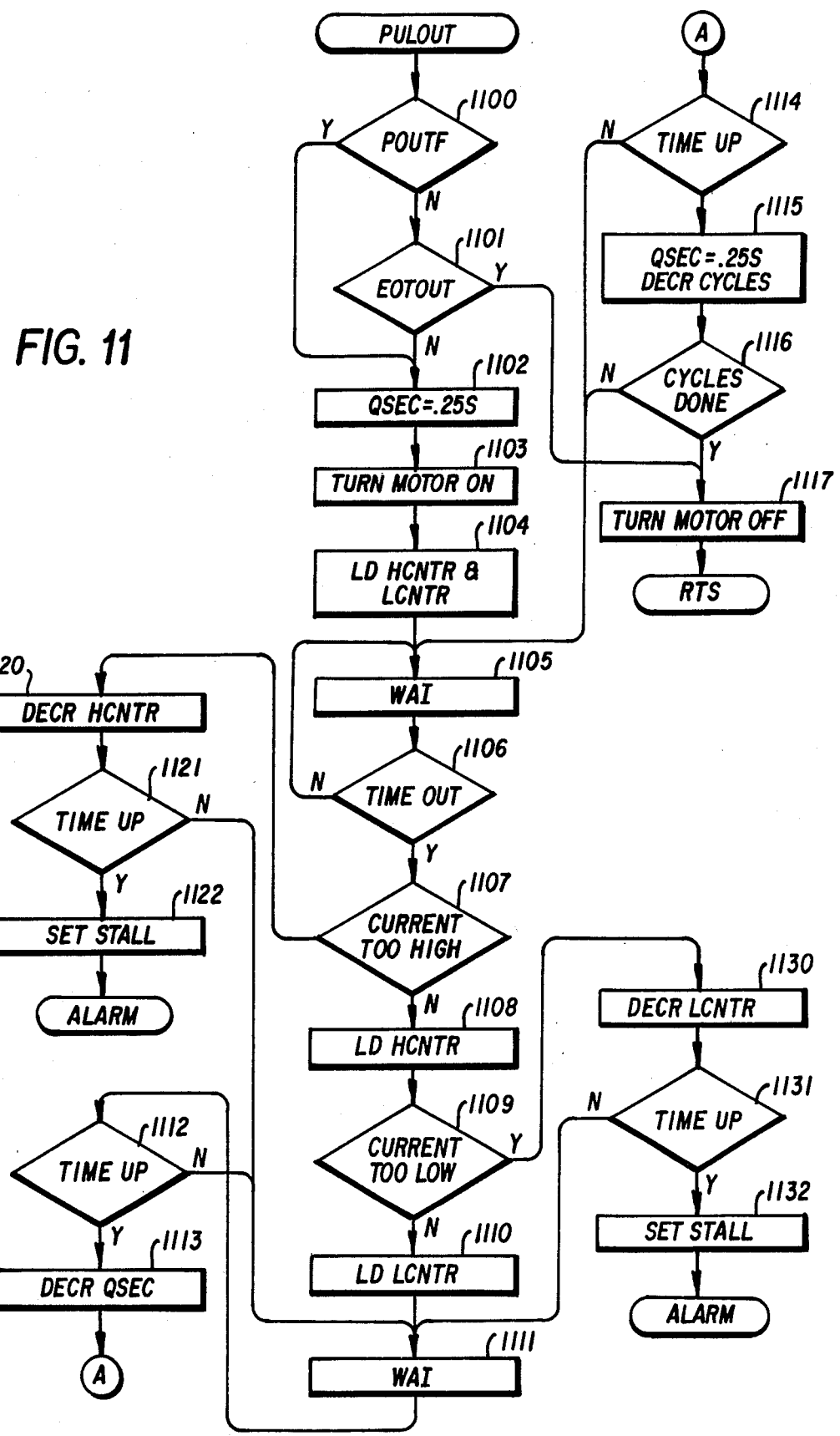
FIG. 11 shows the PULOUT routine.

The PULOUT subroutine shown in FIG. 11 is called for the purpose of moving one end of the shear bar out, i.e. away, from the cutter head by a given amount. At the time the subroutine is called the microprocessor A register holds an indication of which motor 110 or 112 is to be energized and in what direction, and the X register holds a value CYCLES indicating how many ¼-second intervals the motor is to be energized.

The subroutine begins at step 1100 by checking POUTF. If the flag is set the program branches to step 1102 where QSEC is loaded with a value indicating ¼-second. QSEC is decremented at step 1113 each time the loop comprising steps 1105–1116 is executed, and reaches zero after ¼ second.

At step 1103 the microprocessor sends the motor indication to the output register of VIA 208 controlling port B. A signal is produced on the B bus to energize one of the relays K3 or K5 so that one of the motors 110 or 112 is energized to begin moving one end of the shear bar away from the cutter head.

At step 1104 two counter locations HCNTR and LCNTR are loaded with values for timing high current and low current intervals. The motor current is checked as subsequently described to see if it exceeds a predetermined maximum value (e.g. the motor is stalled) or is less than a predetermined minimum value, (e.g. motor winding circuit is open). If it exceeds the maximum value for an interval of time corresponding to the count set in HCNTR or is less than the minimum value for an interval of time corresponding to the count set in LCNTR, the subroutine is terminated and an alarm condition indicated.

At steps 1105 and 1106 the program executes a loop waiting for the motor circuit transients to die out. Each interrupt occuring during execution of the loop causes the NMIR routine to be executed and during its execution the motor current is sensed, converted to a digital value and a saved, as explained with reference to FIG. 8. At step 1107 the saved current value is compared with a reference value to see if the current is too high. Assuming the motor current is not too high, HCNTR is reloaded at step 1108 to restart the high current timing interval.

At step 1109 the current value is compared to a minimum reference value to see if it is too low. Assuming it is not, LCNTR is reloaded at step 1110 to restart the low current timing interval. Steps 1111 and 1112 merely waste time so that the loop comprising steps 1105-1114 takes 0.01 second. At step 1113 QSEC is decremented and at step 1114 it is tested to see if it has reached zero. Assuming it has not, the program branches back to step 1105 and repeats the loop.

After ¼ second the test at step 1114 proves true so the program moves to step 1115 where QSEC is reloaded to time another ¼ second interval, and CYCLES is decremented. CYCLES is then tested at step 1116 to see if the required number of ¼ second intervals have elapsed. If not, the program branches back to step 1105. If the required number of ¼ second intervals has elapsed then the required movement of the moter is complete. At step 1117 the microprocessor sends a value to the output register of VIA 208 which turns off any motor that is on. A return is then made to the calling routine.

If the test at step 1100 shows that POUTF is not set then the program tests the EOTOUT flag to see if either of the limit switches 254 or 256 is actuated. If either limit switch is actuated the program branches to step 1117, turns the motor off, and returns to the calling routine.

If the test at step 1107 shows that the motor current is too high, the program branches to step 1120 where HCNTR is decremented. HCNTR is then tested at 1121 to see if the high current condition has existed for too long a time. If it has not, the program moves to step 1111 and proceeds as described above. If the high current condition persists for too long a time, HCNTR will be decremented to zero and the test at step 1121 will prove true. In this case flags are set to turn on a stall indicator 314 and sound the alarm 286, after which the program jumps to the alarm routine.

Steps 1130-1132 serve the same purpose as steps 1120-1122 except that they time the interval the motor current is below the required minimum.

ADJUST Routine

The ADJUST routine controls the motors M1 and M2 to adjust the shear bar relative to the cutter head. The program jumps to the ADJUST routine from step 706 of the READY routine if the adjust switch 308 has been actuated. The ADJUST routine begins at step 1200 where the Busy flag is set and the Ready Light flag is reset so that indicators 314 will properly indicate the status of the system. The location TIMS is set to 2. If energizations of the motors 110 and 112 result in impacts between the rotating cutter head and the shear bar TIMS is decremented and when TIMS=$\phi$ the adjustment is complete. Certain flags such as IMP1, IMP2 and HITFLG are cleared at step 1200.

At step 1201 EOTIN is tested to see if one of the switches 258 or 260 is actuated because one end of the shear bar is at its limit of travel toward the cutter head. If neither switch is actuated step 1202 checks the RPMOK flag to be sure that the cutter head is rotating faster than a predetermined minimum speed. Assuming that the rpm is satisfactory the program clears the flag for setting the RPM indicator 314.

The program jumps at step 1204 to the TSTGEN subroutine to test the knock sensor 118 and its output circuitry as previously described. Upon the return from this subroutine the program jumps to the GETNOI subroutine to determine the background noise.

At step 1206 the microprocessor fetches M1IN and sets WICHMO to indicate that motor M1 is active. The program then obtains ONTIME, the number of ¼ second intervals the motor M1 is to be energized. M1IN is then sent to VIA 208 and the VIA produces an output signal over its bus to energize relay K2 thereby energizing motor M1 in a direction which moves end A (FIG. 2) of the shear bar 102 toward the cutter head 100.

Figure 12A:
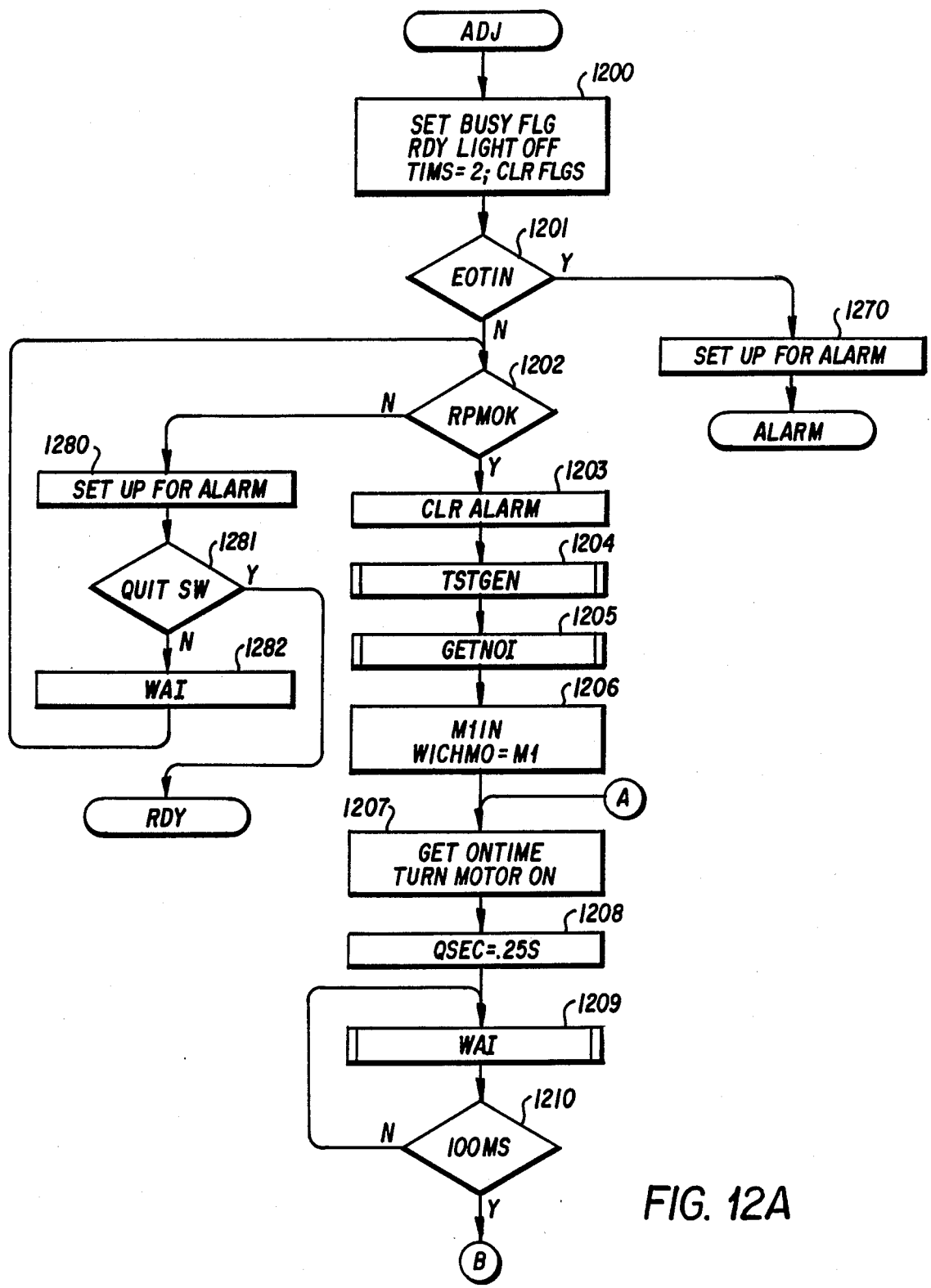
FIGS. 12A-12D show the ADJUST routine.
Figure 12B:
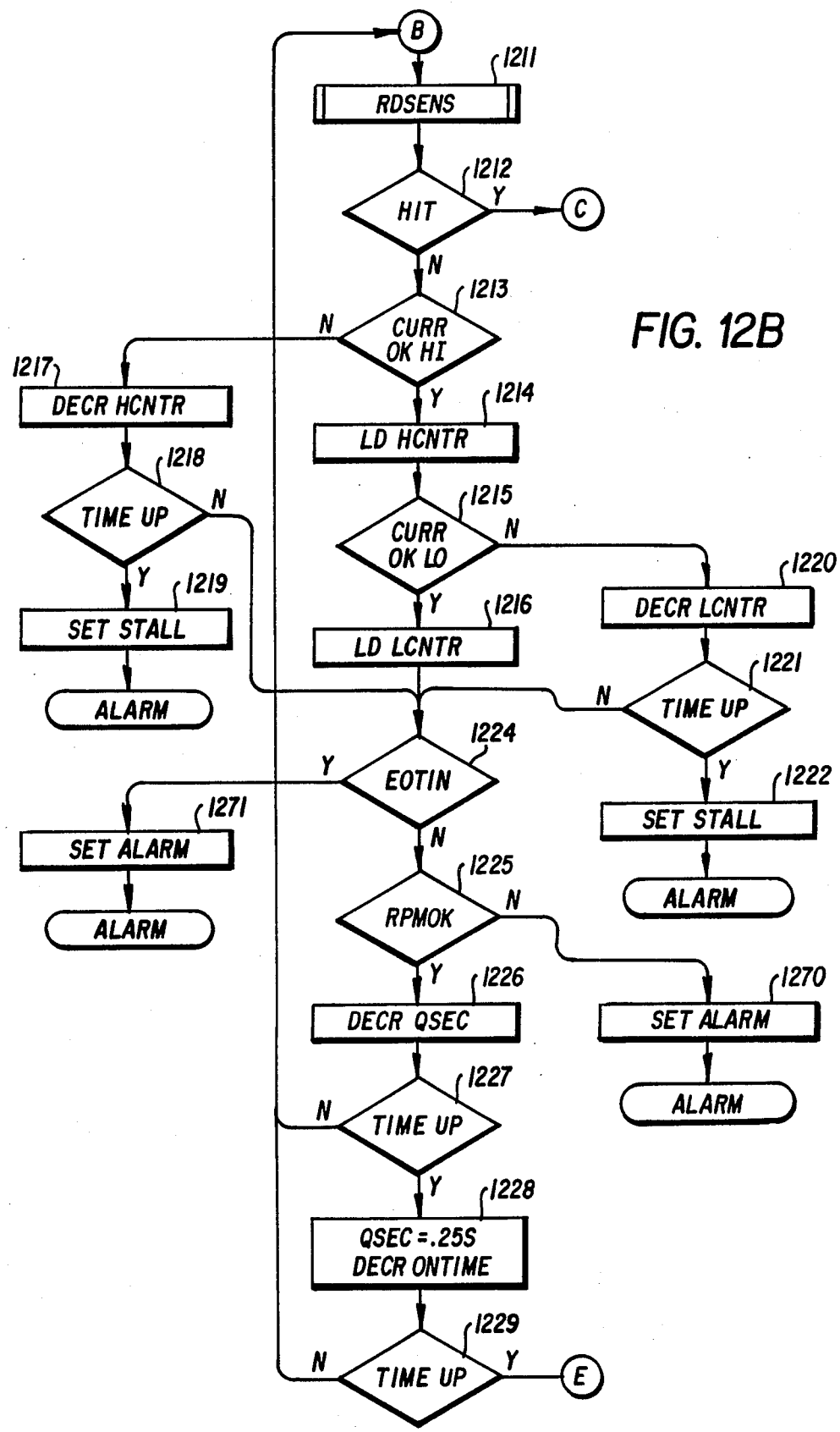
Figures 12C, 12D:
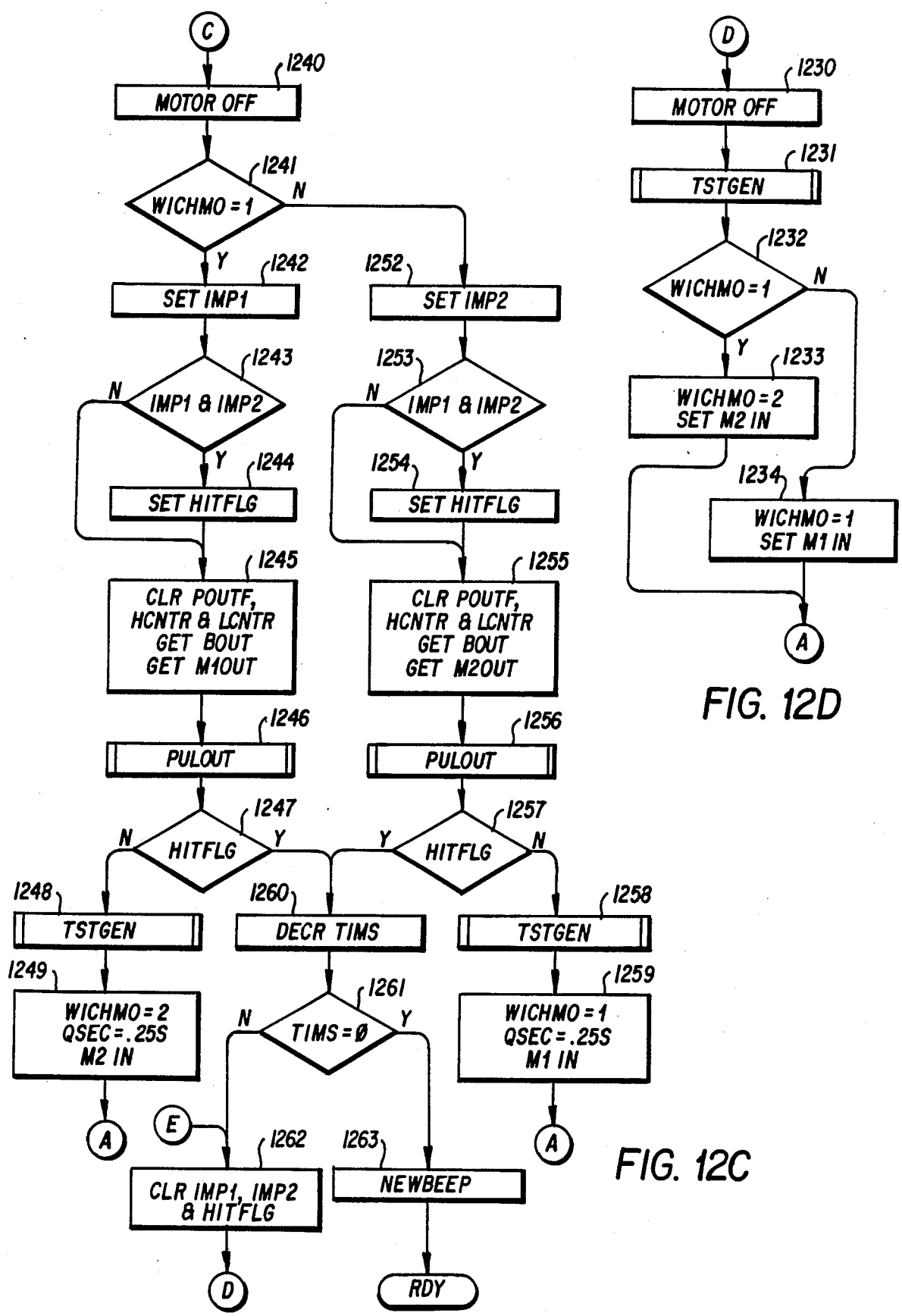

Step 1208 sets QSEC to time ¼ second. Steps 1209 and 1210 introduce a 100 MS delay to allow electrical transients resulting from the motor energization to die down after which a jump is made to the RDSENS subroutine to sample the output of the knock sensor and convert it to a digial value. At step 1212, this value is compared with the value of NOI2 obtained during execution of GETNOI at step 1205. If the knock sensor ouptut value is greater than NOI2 it indicates that the cutter head is hitting the shear bar so the program branches to FIG. 12C.

Assuming that the sensor output value is less than NOI2, no hit has occurred so the program proceeds from step 1212 to step 1213 where the motor current value obtained during the last execution of the NMIR routine is compared to a value representing the maximum allowable current. If the motor current does not exceed the maximum allowable value then at step 1215 it is compared with a value representing the minimum allowable current. It may be noted that steps 1213-1222 of the ADJUST routine correspond exactly with steps 1107-1113, 1120-1122 and 1130-1132 of the PULOUT subroutine described above.

If the checks of the motor current show that it is within the prescribed limits then at step 1224 the EOTIN flag is checked to see if the motor has driven the end of the shear bar to its inward limit of travel. If it has not, the RPMOK flag is checked to see if the cutter head is still rotating. Assuming it is, QSEC is decremented at 1226 and then tested at 1227 to see if ¼ second has elapsed.

If the test at step 1227 shows that ¼ second has not elapsed then the program loops back to step 1211 and repeats the loop comprising steps 1211-1216 and 1224-1227. When ¼ second has elapsed the test at step 1227 proves true and the program moves to step 1228 where it resets QSEC to time another quarter-second interval and decrements ONTIME, the number of quarter second intervals that the moter is to be on. In a typical system ONTIME may be about 10.

After ONTIME is decremented it is tested at step 1229 to see if the motor energizing interval has expired.

If it has not, the program loops back to step 1211. If the energizing interval has expired the program moves to step 1262 (FIG. 12C) where the flags IMP1, IMP2 and HITFLAG are cleared. The program then proceeds to step 1230 (FIG. 12D) where the microprocessor sends a code to VIA 208 which terminates the output signal for energizing relay K2. When relay K2 opens motor M1 stops. A jump is then made to the TSTGEN subroutine to check the operation of the knock sensor before beginning the movement of the other motor. Upon the return from TSTGEN the location WICHMO is tested to see if M1 or M2 was the motor whose movement was just completed. If WICHMO indicates M1 then at step 1233 it is set to indicate M2 and the code is obtained for controlling M2 to move the shear bar inwardly toward the cutter head. On the other hand, if the test at step 1232 should indicate that WICHMO is set to M2 then at step 1234 it is set to indicate M1 and a code is obtained for controlling M1 to move the shear inwardly. After completion of step 1233 or 1234 the program branches back to step 1207 (FIG. 12A) where the code obtained at step 1233 or 1234 is sent to VIA 208 to energize either relay K2 or K4 and thereby activate motor M1 or M2 to move its end of the shear bar inwardly toward the cutter head.

Depending on the position of the shear bar at the time the adjusting procedure is initiated, M1 and M2 may be alternately energized one or more times as described above without driving either end of the shear bar into contact with the rotating cutter bar. Eventually however energization of one of the motors will result in contact. When RDSENS is executed at step 1211 to read the knock sensor output, this output will be larger than NOI2. Therefore, when the knock sensor output is compared to NOI2 at step 1212 the program recognizes the hit and branches to step 1240 (FIG. 12C) where a code is sent to VIA 208 which deenergizes all relays K2-K5 thereby stopping all motors. At step 1241 WICHMO is checked to see which motor caused the hit. If it was M1 then the flag IMP1 is set at step 1242. IMP1 and IMP2 are checked at step 1243 to see if both have been set. If both IMP1 and IMP2 are set then HITFLG is set at step 1244 before step 1245 is executed. If IMP1 and IMP2 are not both set then the program branches from step 1243 to 1245.

At step 1245 the flag POUTF is cleared, the code for moving M1 outwardly is fetched to the microprocessor A register and BOUT, the number of quarter-second intervals the motor is to be energized, is loaded into the microprocessor X register. BOUT may be on the order of 5. A jump is then made to the PULOUT subroutine to energize M1 in a direction to move the shear bar away from the cutter head.

Upon return from the PULOUT subroutine HITFLG is tested. If it is not set, i.e. there hasn't been at least one impact by each of the motors, the program moves to step 1248 where the TSTGEN subroutine is executed to test the knock sensor. At step 1249 WICHMO is set to indicate M2, QSEC is reset to time a quarter-second interval, and the code is obtained for controlling the motor M2 to move the shear bar inwardly. The program then branches back to step 1207 where the motor is turned on by sending the code to the VIA 208.

Returning to step 1241, if the test shows that WICHMO is set to indicate M2 then the program branches to step 1252. Steps 1252-1259 correspond to steps 1242-1249 the only differences being that the flag IMP2 is set at step 1252, the code for energizing M2 is obtained at step 1255, and WICHMO is set to M1 and the code for energizing M1 is obtained at step 1259.

If a test at step 1247 or 1257 shows that HITFLG is set, the program then decrements TIMS at 1260 and tests it at 1261. If TIMS is not zero the program branches to 1262 to clear IMP1, IMP2 and HITFLG in preparation for checking for another set of impacts, one by each end of the shear bar. It then proceeds to FIG. 12D where the state of WICHMO is changed and the code for next energizing one of the motors is obtained before branching back to step 1270 to energize the motor.

If the test at step 1261 proves true it means that the adjusting sequence is complete. A flag is set at step 1263 to beep the alarm 286, and the program then jumps to the READY rotine.

It has been found that after two "hits", i.e. after impacts have twice caused HITFLG to be set, the shear bar is spaced on the order of 0.005 to 0.010 inch from the cutter head and essentially parallel thereto. The gap between the shear bar and the cutter head at the end of the adjusting procedure is governed in large part by the value of BOUT at step 1245 or 1255 which in turn controls the duration of motor energization during the PULOUT subroutines at steps 1247 and 1248.

If the test at step 1201 or 1224 shows that the EOTIN flag is set, it means that one of the end of travel switches 258 or 260 is actuated because one end of the shear bar has been moved to its limit of travel toward the cutter head. In this case the program sets flags to turn on one of the indicators 314 to indicate EOT and sound an alarm, and then jumps to the ALARM routine. In like manner, if the RPMOK flag is not set when the test is made at step 1225, the programs sets appropriate flags to turn on the RPM indicator and the alarm, and jumps to the ALARM routine.

At step 1202, the RPMOK flag is tested prior to any motor actuation. If the flag is not set the program sets flags for giving the alarm indication and at step 1281 tests the QUIT flag to see if the operator has depressed the Quit switch. If he has, the program jumps to the ready routine. If he has not, a Wait for Interrupt is executed during the wait. The program then branches back to step 1202 to again check the RPMOK flag. If the cutter head is up to speed the program then clears the alarm flags at step 1203.

It will be recognized by those skilled in the art that by properly programming the VIA 208 so that some bus bit positions alternately serve as input or output, it would be possible to completely dispense with the PIA 206. Thus, there is wide latitude in programming the control of the various indicators and alarms. For this reason the ALARM routine is not specifically described. The PIA 206 becomes necessary only when additional control features such as an automatic knife sharpener control are added into the system.

PULFOUT Routine

As previously indicated, the PULSW flag is set if the Quit and Adjust switches are actuated concurrently. By actuating both switches the operator may initiate the PULFOUT routine which moves each end of the shear bar to its limit of travel away from the cutter head.

Figure 13:
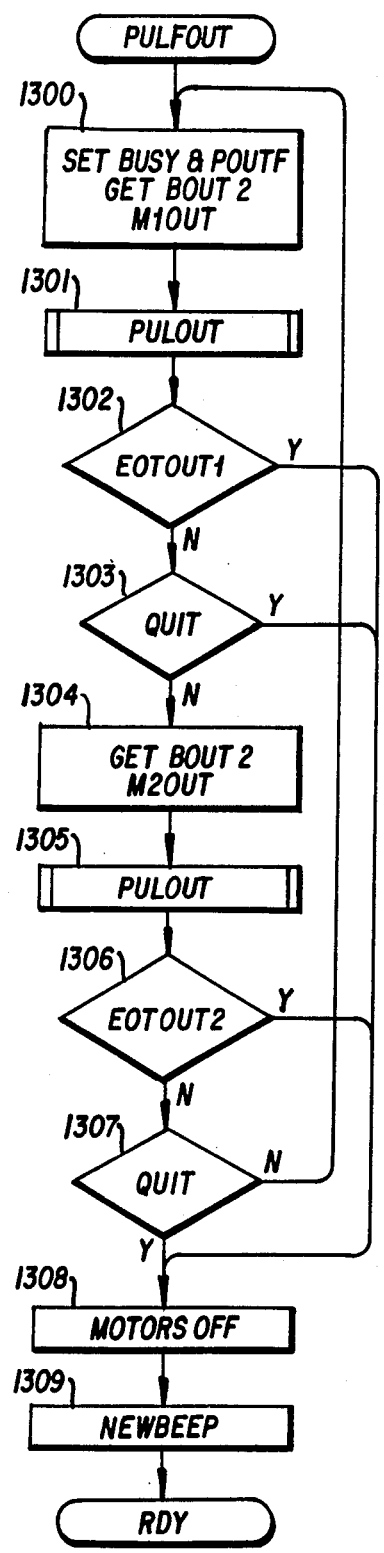
FIG. 13 shows the PULFOUT subroutine.

If the test at step 708 shows that PULSW is set the program jumps to the PULFOUT routine shown in FIG. 13. At step 1300 the Busy and POUTF flags are set, the length of time for energizing the motor is loaded in the microprocessor X register, and the code for energizing M1 to move the shear bar outwardly is entered in the A register. The program then jumps to the PULOUT subroutine to energize M1. Upon the return to PULFOUT EOTOUT1 is tested to see if end A of the shear bar is at its limit of travel If not, the QUIT flag is tested at 1303. Assuming the Quit switch has not been actuated by the operator the microprocessor gets the control values for moving motor M2 outwardly (step 1304) and executes the PULOUT subroutine at step 1305 to move end B of the shear bar. Step 1306 tests EOTOUT2 to see if end B of the shear bar is at its limit of travel and if it is not the QUIT flag is tested at step 1307.

If the Quit switch is not depressed the program branches back to the beginning of the subroutine and continues executing the steps described above. When end A of the shear bar reaches its outward limit of travel the test at 1302 proves true and the program branches to turn off the motor (step 1308) and set the flag for beeping the alarm (step 1309). The program then jumps to the READY routine. The program also branches to step 1308 if the test at step 1306 indicates that end B of the shear bar is at its outward limit of travel.

The PULFOUT subroutine may be halted by depressing the Quit switch alone. This sets the QUIT flag so that the program will branch from step 1303 or 1307 to step 1308, thus ending the pullout operation.

In summary, the present invention provides a completely automatic control for adjusting the position of a shear bar relative to a rotating cutter head by alternately energizing first one and then the other motor to alternately move first one end of the shear bar and then the other. The system includes a knocker for inducing vibrations into the shear bar so that the operability of the knock sensor and its associated circuitry may be automatically checked. The system also automatically checks "noise" vibrations in the shear bar and adjusts the sensitivity of the system to the output signal from the knock sensor.

While a specific preferred embodiment of the invention has been described in detail, various modifications and substitutions may be made in the described embodiment without departing from the spirit and scope of the invention as defined by the appended claims.

The embodiments of the invention in which an exclusive property or privilege are claimed are defined as follows:

1. In a cutting apparatus having an adjustably fixed shear bar cooperating with a rotating cutter head to cut material passing between the bar and head, the improvement comprising:
    first and second bidirectional motors;
    first means responsive to said first motor for moving a first end of said shear bar relative to said cutter head;
    second means responsive to said second motor for moving a second end of said shear bar relative to said cutter head;
    sensing means for sensing contact between said shear bar and said cutter head;
    start control means; and,
    electrical control means responsive to said start control means and said sensing means for controlling said first and second motors to adjust the position of said shear bar,
    said electrical control means including means for alternately energizing one of said motors and then the other whereby one end and then the other end of said shear bar is moved until said shear bar is adjusted relative to said cutter head.

2. The improvement as claimed in claim 1 wherein said sensing means comprises a vibration sensor mounted on a support bar which also supports said shear bar.

3. The improvement as claimed in claim 1 wherein said shear bar is longer than the width of said cutter head.

4. The improvement as claimed in claim 1 wherein said electrical control means comprises a microprocessor, a memory, an analog to digital converter, an interface adapter interconnected by bus means, said sensing means being connected to said analog to digital converter, and means connected to said interface adapter for energizing and controlling the direction of rotation of said motors in accordance with signals applied by said sensing means to said analog to digital converter and a program executed by said microprocessor.

5. The improvement as claimed in claim 4 wherein said electrical control means includes means for sensing the magnitude of current flowing through said motors and deenergizing said motors if said magnitude falls above or below a predetermined range for a predetermined interval of time.

6. The improvement as claimed in claim 4 wherein said electrical control means includes sensing the rate of rotation of said cutter head and deenergizing said motors if said rate of rotation is less than a predetermined minimum rate.

7. The improvement as claimed in claim 1 and further comprising test signal generator means responsive to said electrical control means for inducing vibrations in said shear bar which may be sensed by said sensing means to determine the operability of said sensing means.

8. A method of adjusting the position of a shear bar relative to a rotating cutter head in a cutting apparatus having an adjustably fixed shear bar cooperating with a rotating cutter head to cut material passing between the bar and head, and first and second bidirectional motors connected to move first and second ends of said shear bar, said method comprising the steps of:
    energizing said first motor to move a first end of said shear bar toward said head for a fixed interval of time or until it contacts said cutter head and then energizing said first motor to move said first end away from said cutter head a predetermined distance,
    deenergizing said first motor;
    energizing said second motor to move a second end of said shear bar toward said cutter head for a fixed interval of time or until it contacts said cutter head and then energizing said second motor to move said second end away from said cutter head said predetermined distance;
    deenergizing said second motor; and
    repeating each of the preceding steps until said first and second ends of said shear bar each contacts said cutter head on each of two separate energizations of the respective motors which move said ends.

9. The method as claimed in claim 8 wherein contact between said shear bar and said cutter head is determined by sensing vibrations in said shear bar.

10. The method as claimed in claim 8 wherein, prior to energizing either motor to move the shear bar toward the cutter, each motor is energized for a fixed interval of time to move the shear bar away from the cutter head.

11. In a cutting apparatus having an adjustably fixed shear bar cooperating with a rotating cutter head to cut material passing between the bar and head, and a vibration sensor for sensing contact between said bar and head, the improvement comprising:
 first means for inducing vibrations in said shear bar which may be sensed by said vibration sensor;
 an analog to digital converter responsive to said vibration sensor for producing a digital value indicative of the magnitude of output signals produced by said vibration sensor in response to vibrations in said shear bar;
 indicator means; and,
 microprocessor controlled means for energizing said first means to induce said vibrations, comparing said digital value to a reference value, and energizing said indicator means if said digital value is less than said reference value.

12. In a cutting apparatus having an adjustably fixed shear bar cooperating with a rotating cutter head to cut material passing between the bar and head, the improvement comprising:
 vibration sensing means for sensing vibrations in said shear bar;
 analog to digital converter means responsive to said sensing means for producing a digital value indicative of the magnitude of vibrations in said shear bar;
 motor means for selectively moving said shear bar toward or away from said cutter head; and,
 sequence control means for selectively energizing said motor means to move said shear bar away from said cutter head, sensing said digital value and adding a reference value thereto to obtain a sensitivity level value, moving said shear bar toward said cutter head while sampling said digital value for evidence of contact between said shear bar and cutter head, and stopping movement of said shear bar toward said cutter head when said sampled digital value exceeds said sensitivity level value.

* * * * *